INVENTOR.
HARRY L. KELLER
BY
Alfred G Body
ATTORNEY

Oct. 13, 1953     H. L. KELLER     2,655,368
MEANS FOR CONTINUOUS HEATING AND COOLING
OF LONG FLEXIBLE ELEMENTS
Filed Jan. 15, 1949     2 Sheets-Sheet 2

INVENTOR.
HARRY L. KELLER
BY
ATTORNEY

Patented Oct. 13, 1953

2,655,368

UNITED STATES PATENT OFFICE 2,655,368

MEANS FOR CONTINUOUS HEATING AND COOLING OF LONG FLEXIBLE ELEMENTS

Harry L. Keller, Cleveland, Ohio, assignor to The Ohio Crankshaft Company, Cleveland, Ohio, a corporation of Ohio Application January 15, 1949, Serial No. 71,166

2 Claims. (Cl. 266—3)

This invention pertains to heating apparatus and, more particularly, to apparatus for continuously heating long continuous lengths of flexible articles of manufacture.

The invention is particularly adapted, although not limited to, heating lengths of small diameter wire or thin strip either for the purposes of annealing or heating above the critical point and quenching for hardening. The invention will be described as applied to the heating of lengths of wire, although it will be understood that the invention is not so limited.

The continuous heating of long lengths of wire for the purpose of annealing or hardening and, particularly, with reference to annealing is quite desirable because if capable of accomplishment, the apparatus for so doing can be used in direct conjunction with other continuous manufacturing operations on the wire, such as wire drawing or the like.

Heretofore, the continuous heating of such wire, at least in a sufficiently limited space, was considered almost impossible of attainment. In the manufacturing operations referred to, the speed of movement of the wire is generally quite high. During the time of bringing the wire up to and holding it at the annealing temperature, the wire will have moved a considerable linear distance. Using conventional methods, this would require a corresponding length of oven which is prohibitive in modern manufacturing operations.

In addition, the wire would have to be supported at a plurality of points throughout its length in order to prevent excessive sag in the wire or excessive tension when in the heating state. Even so, at high temperatures, almost any tension will serve to change the diameter of the wire and the supports many times will abrade the surface of the wire. If the wire is wound around a drum, it is abraded as the drum rotates and the wire slides axially therealong.

In the field of annealing, radiant heat has been used but has the disadvantage of a relatively slow rate of heat transfer to the wire, thus requiring excessive bulkiness of equipment to permit the wire to be brought to the annealing temperature at high linear speeds. The temperature of the radiant source may be increased to increase the rate of heat transfer. However, hot spots on the wire result, as well as the continuous problem of the wire being burned or melted in the event of a breakdown and stoppage of the movement of the wire.

Resistance heat can be used, but in this case arcing is liable to occur at the point of electrical contact to the wire such as to produce an imperfect surface on the finished annealed wire.

Electric induction heating has been proposed. For small diameter wire, it is extremely difficult to obtain an efficient transfer of energy; that is, to secure adequate electrical coupling and the heating rate is unduly slow even for induction heating equipment. With all of such above referred to heating means, an excessively long passage is required in which to bring the wire up to the annealing temperature which, in conjunction with the linear movement of the wire during the annealing period when the temperature has been reached, requires excessively large equipment which is practically impossible to install in any existing manufacturing plant, particularly in conjunction with existing continuous manufacturing operations. To install such equipment would require the design of a plant from the beginning to incorporate such equipment. Even so, the problem of sag and tension on the wire due to long spans is not solved.

The result of such difficulties has been to abandon continuous heating of wire in conjunction with other manufacturing operations for the purpose of annealing or otherwise. The compromise has been to coil the wire at some point in the manufacturing operation and transport it to a distant radiant-type oven where it is heated for a period of time, oftentimes approaching eight hours. This period of time is required partly because of the low temperatures which must be used in such ovens and to allow time for the coil to be heated throughout.

Needless to say, coiling the wire, transporting it to the oven and transporting it back to the scene of the manufacturing operation is quite expensive partly due to the extra labor involved and partly due to the volume of wire which must necessarily be in process at one time.

In view of the foregoing, it is an object of the present invention to provide a new and improved means and method for heating long continuous lengths of flexible materials which is simple in construction, economical to manufacture, gives rapid heating, is efficient thermodynamically, occupies a minimum of floor space and gives a maximum degree of control over the heating operation.

Another object of the invention is the provision of a new and improved apparatus which will quickly raise the temperature of a long flexible length of material to be heated, hold it at the temperature the required time, and which will occupy a space sufficiently small and compact to enable the positioning of the apparatus in conjunction and in association with other equipment for the continuous processing of the article.

Another object is to heat the wire by conduction of heat thereat directly from a heated surface without the danger of the wire abrading on the surface.

Still another object of the invention is the provision of an improved apparatus which will continuously heat a length of wire or strip and occupy a minimum of floor space.

Another object is to obtain the speed of conduction-type heating without any of the disadvantages.

Still another object is the provision of equipment for heating long flexible lengths of wire or strip which permits of having a maximum length of the material in a minimum space.

Another object is the provision of apparatus for maintaining long lengths of material in the heated state wherein the tension stresses on the material are held to an absolute minimum.

Another object of the invention is the provision of apparatus for continuously heating long lengths of flexible material wherein when the material is in the heated condition, it is under a minimum of stress whereby to substantially eliminate distortion, elongation, decrease in transverse dimensions or breakage.

Another object is the provision of means and method for heating small diameter wire or strip, by means of relatively low-frequency electric induction heating.

Yet another object is the provision of equipment wherein there is no danger of overheating in the event of a breakdown of other equipment for which the heating is being done.

Still another object is the provision of apparatus including a heated drum over which a long continuous length of flexible wire or strip can be coiled and advanced axially without the abrasion of the wire or strip on the surface of the drum.

Other and more specific objects will appear upon a reading and understanding of the description of one specific embodiment of the invention.

Generally speaking, the invention comprises a method and apparatus for bringing a rapidly moving wire or strip into repeated engagement and re-engagement with a heated surface moving at the same rate of speed as the wire; and during the time the wire or strip is out of engagement with the surface, advancing it along a dimension of the surface transverse to the direction of movement.

More specifically, the invention may be said to comprise apparatus including a drum about which the wire or strip is wound in a plurality of turns and means associated with each turn for removing the wire from the drum and allowing it to re-engage the drum at a point advanced axially from where it left the drum. The drum itself may be heated to heat the wire by conduction and may be cooled in portions to remove heat from the wire before it comes into tension of a wind-up spool or feed mechanism of the next operation.

The invention consists of certain methods and steps and constructions and arrangements of parts, a preferred embodiment of which is described in this specification and illustrated in the attached drawing which is a part hereof; and wherein.

Figure 1:
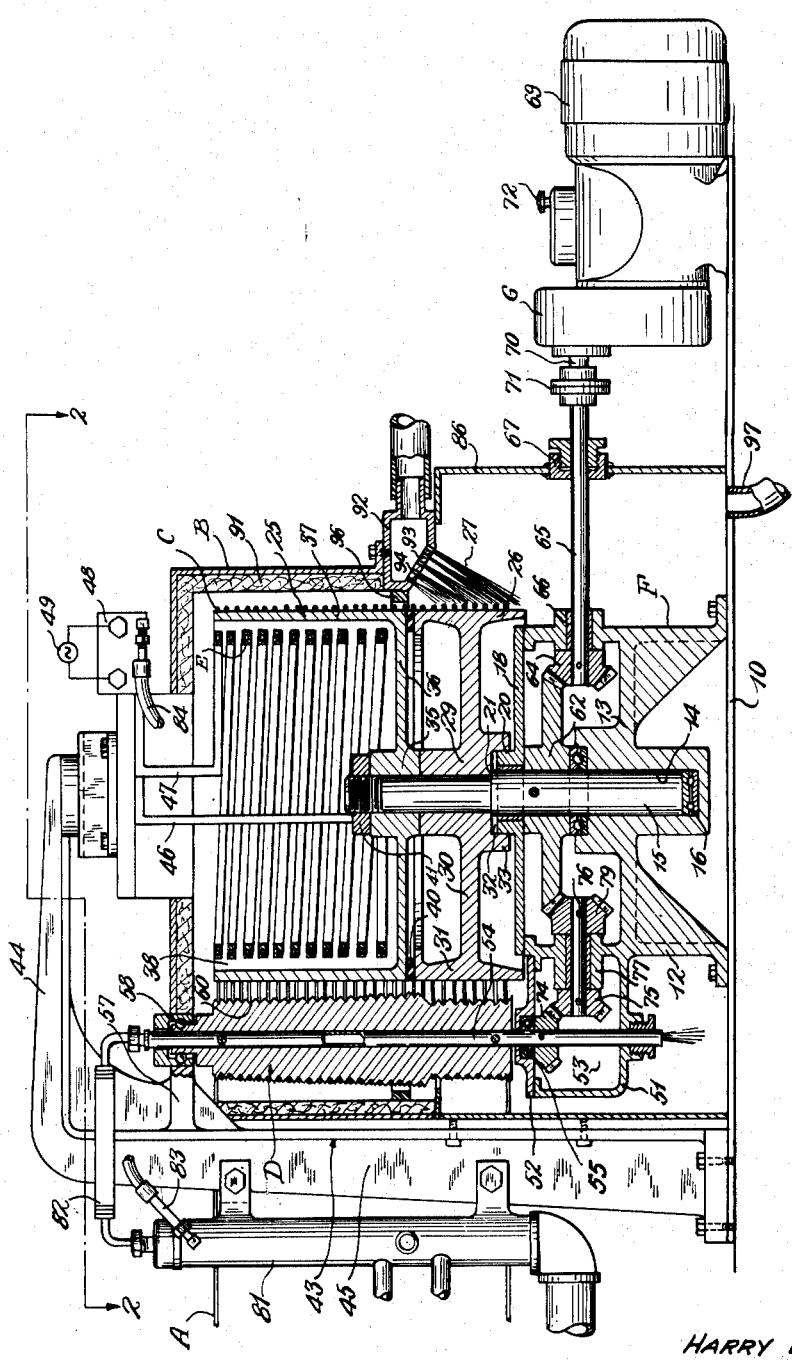
Figure 1 is a side view, partly in section, of a continuous wire-annealing apparatus embodying the present invention, the section being taken approximately on the line 1—1 of Figure 2.

Referring now to the drawings wherein a preferred embodiment only of the invention is shown for the purposes of illustration and not as a limitation on the scope of the invention, Figure 1 shows a wire A being fed through an opening in a housing B, thence several times around a hollow main heating drum C and an adjacent feed spindle D and thence out through an opening in the lower part of the housing. The spindle D serves to advance the wire A axially along the drum C without abrasion or the like. The drum C, in the embodiment shown, is heated to a desired elevated temperature by a high-frequency inductor coil E positioned in the interior of the hollow drum C, the heat from the drum being transferred to the wire A in contact with the outer surface of the drum by conduction. The drum and spindle are each rotatably supported on a supporting frame F and rotated by a driving mechanism G, which may be the driving power for advancing the wire A through the apparatus.

The frame F is arranged to support the drum from one end only and to accommodate positive driving mechanism for both the drum and spindle. It comprises a base plate 10 and a central-support member 12 positioned generally centrally of and on the upper surface of the base plate 10. This member is generally cylindrical in shape and is positioned with its axis in a vertical position. A horizontal web 13 extends across the interior of the member 12 and is positioned generally centrally of the upper and lower ends of the member. The web 13 has centrally located bosses on both sides, having an upwardly opening aperture 14 formed therein. A shaft 15 is rotatably supported in this aperture 14 with a thrust bearing 16 disposed between the lower end of the shaft and the bottom of the aperture 14.

A cover plate 18 extends across the upper ends of the member 12 in spaced relation to the horizontal web 13. This plate has a central opening formed therein through which the shaft 15 extends, and an upwardly-extending collar 20 surrounds this opening. The cover plate 18 may be fixed to the upper ends of the member 12 by any suitable means. The shaft 15 extends a substantial distance above the top of the cover plate 18 and collar 20. Just above the upper edge of the collar 20, the shaft 15 is reduced in diameter for the rest of its upper length to form a shoulder 21. The shaft 15 and shoulder 21 provide the main rotatable support for the drum C.

The drum C is preferably formed in two separate portions; a heating portion 25 and a cooling portion 26, preferably, at least in partial heat-insulated relationship with respect to each other. The cooling drum 26 preferably has a stream of water 27 directed thereagainst at a downward angle and is positioned axially lowermost. The cooling drum 26 shown comprises a central hub 29 through which the shaft 15 extends, a radially-extending flange 30 and an outer, axially-extending, circumferential tread 31, preferably having a substantial diameter.

The lower side of the hub 29 rests on the shoulder 21 and has a recess 32 formed therein into which the collar 20 of the cover plate 18 extends. The recess 32 thus forms a collar 33 which overlaps the collar 20. This arrangement provides a seal to prevent gases or moisture from working from the heating space into the interior of the member 12.

The heating drum 25 is generally "cup" shaped having a central hub 35 through which the shaft 15 extends, an outwardly, radially-extending flange 36 and a tread portion 37 which extends upwardly from the outer end of the flange 36 forming an upwardly-opening recess or cavity 38. The lower end of the hub 35 rests against the upper end of the hub 29. A washer of heat-insulating material may be positioned therebetween if desired. As is shown, the diameter of the heating drum tread 37 and the cooling drum tread 31 are the same and a heat-insulating ring 40 is disposed intermediate adjacent the ends of the treads with its outer surface flush with the outer surfaces of the treads. A nut 41 threaded on the upper end of the shaft 15 and bearing against the upper end of the hub 35 holds the assembly in position. If desired, the respective drums may be keyed or otherwise rigidly fixed to the shaft 15.

The drum 25, as will appear hereinafter, is heated to an elevated temperature. Accordingly, it is preferred that it be formed of a material such as stainless steel or the like which will not oxidize or produce scale at elevated temperatures.

The tread 37 of the drum 25 may be heated by any one of a plurality of different means such as flame heat, electrical-resistance heat; but, preferably, is heated by means of high or low-frequency alternating electric currents induced in the drum. In the embodiment shown, a high-frequency alternating current inductor coil E comprised of a plurality of slightly-spaced and insulated turns of water-cooled rectangular copper tubing is disposed within the cavity 38. Preferably, the outer diameter of the coil E is just slightly less than the inner diameter of the tread 37. The coil E is supported in position by a bracket 43 having a vertical arm 45 fixed at its lower end to the base plate 10 and an upper horizontal arm 44 extending over and spaced from the upper end of the heating drums. The heating coil E has a pair of leads 46, 47 extending from the respective ends thereof and connecting to a terminal board 48 which may, in turn, be connected to a suitable source of high-frequency current 49. High-frequency electric current is circulated through the coil E which induces circumferential heating currents in the tread 37. If desired, magnetic laminations may be utilized to increase the heating efficiency of the coil E.

The spindle D is positioned alongside and slightly spaced from the drum C and is rotatable on a shaft 54 having an axis parallel to the axis of the shaft 15. To support the spindle D, the support member 12 has a thin-walled, hollow, external side extension 51 open at the upper end. A cover plate 52 is fixed to the upper end of the extension 51 to provide an enclosed chamber 53 interiorly of the extension 51. The cover plate 52 and the lower wall of the extension 51 are provided with aligned openings through which the lower end of the shaft 54 extends and is rotatably journaled. To support the upper end of the shaft 54, the bracket 43 has an arm 57 adjacent to but spaced from its upper end extending to the right which has an opening aligned with the openings in the cover plate 52 and the extension 51 through which the upper end of the shaft 54 extends. The shaft 54 is rotatably journaled in this opening by means of roller bearings 58.

The spindle D is shown as solid cylindrically-shaped and has a plurality of V-shaped, circumferentially-extending grooves 60 in its outer surface. The purpose of the spindle D is to remove the wire from the surface of the drum C so that it may be advanced axially down the surface of the drum C without abrading thereon or the like. Each groove 60 has a turn of wire A therein and effects this axial movement.

In the embodiment shown, the wire A enters from the left-hand side of the apparatus, makes a substantially 300 degree turn about the drum C, then leaves the drum, passes over the spindle D being guided by one of the grooves 60 and thence returns into contact with the outer surface of the drum C where it again makes a substantially 300 degree contact and then again leaves the drum to be advanced axially downward thereof. As the heating drum C is at an elevated temperature, heat flows from the surface thereof to the wire A by conduction and is heated rapidly to substantially the temperature of the drum. Also, some heat will be transferred to the wire by radiation and a lesser amount by convection of any heated air in the chamber. The length of the spindle D is preferably the same as the length of the combined heating drum 25 and cooling drum 26.

It will be appreciated that the wire A, as it advances down the axial length of the heating drums and the spindle D, will become heated and will expand or lengthen slightly. It is preferred that the diameter of the spindle D increase slightly in a downward direction to compensate for the heat expansion of the wire and to maintain the wire in a continuous, firm, heat-conducting contact with the surface of the heating drum 25. When the spray of cooling water 27 strikes the heated wire as it comes onto the cooling drum 26, it will be appreciated that the length of the wire will contract rather abruptly. To compensate for this abrupt contraction of the length of the wire and to prevent undue tension in place thereof, the diameter of the spindle D is decreased rather abruptly at a point just opposite from or below the insulating ring 40. Subsequently and below this point, the diameter may remain relatively constant or continue to decrease slightly. The exact dimensions of the spindle D may be varied to suit the particular type of metal being annealed and the heating and cooling characteristics of the apparatus. The changes in the dimension of the spindle D are shown in exaggerated form in the drawings. It will be appreciated that the outer surface of the heating drums may be grooved in a manner similar to that of the spindle D. The area for heat transfer will thus be increased. Likewise, the diameter of the spindle D can be increased to correspond to the diameter of the heating drums C and, if desired, the spindle D can be made of the same type of construction as the heating drums and heated in a like manner.

It is preferred that both the heating drum C and the spindle D be positively driven and at substantially the same peripheral speed.

The drum C and the spindle D may be driven in any suitable manner but, in the embodiment shown, a bevel gear 62 is keyed to the shaft 15 intermediate the lower side of the cover plate 18 and the upper side of the web 13. The bevel gear 62 is positively driven by a bevel spur gear 64 in engagement therewith and mounted at the left-hand end of a drive shaft 65, which shaft is suitably journaled in a bearing 66 formed in the member 12 and a bearing 67 in the housing B. A constant-speed motor 69 drives the shaft 65 through a variable ratio transmission 70. The driving mechanism G just described is relatively conventional and forms no part of the invention.

The spindle D, as stated, is also positively driven, and at a fixed predetermined speed relative to the drum C so that the peripheral speeds are the same. In the embodiment shown, the shaft 54 has a bevel spur gear 74 fixed thereto just below the cover plate 52. This gear meshes with a second bevel spur gear 75 fixed to the end of a horizontal shaft 76. The shaft 76 is rotatably supported in a suitable bearing 77 formed in the wall of the member 12. The right-hand end of the shaft 76 has a bevel spur gear 79 which meshes with the bevel gear 62. It will be appreciated that by selecting spur gears having the proper pitch and the proper number of teeth, the relative rate of rotation of the spindle D and the heating drum C may be readily determined. A constant tension could also be used.

While some variation in the peripheral speed of the spindle will exist along its axial length due to the variation in diameter referred to above, it is not enough to be detrimental or to unduly abrade the surface of the wire. It is preferred that the speeds of rotation be so chosen that they are equal during the time the wire is hottest. In this way, no undue tension will be on the wire to stretch it or abrade it across the drums when in the heated state.

Provision for cooling the apparatus has also been made. In the preferred embodiment of the invention, the shaft 54 is hollow and is connected to a water manifold 81 by means of a flexible hose 82. The manner in which the upper end of the shaft 54 is connected to the manifold 81 is unimportant but should be such that the shaft 54 may be rotated without turning the hose 82 and without the leakage of cooling water therebetween. The cooling water flowing from the manifold 81 through the shaft 54 serves to maintain the bearings 58 and 55 cooled so that they will operate satisfactorily. The manifold 81 is also provided with a suitable cooling connection 83, 84 so as to provide cooling water for the induction-heating coil E.

Figure 3:
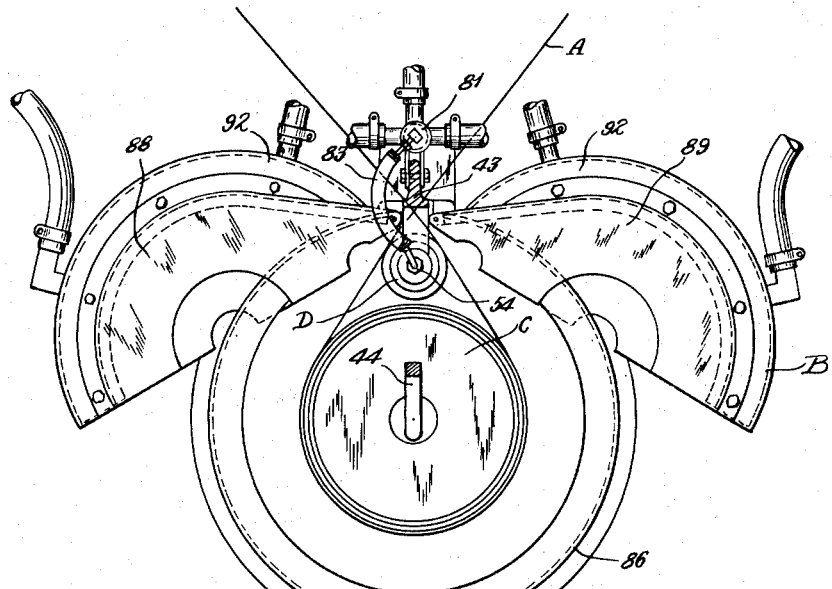
Figure 3 is a view similar to Figure 2 but showing the upper housing for the apparatus in opened-out position so that a new wire may be loaded thereinto.
Figure 2:
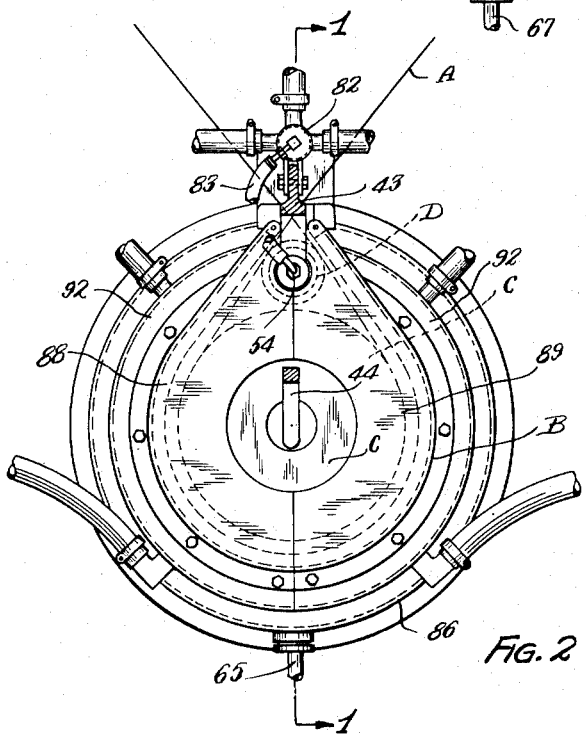
Figure 2 is a top elevational view of Figure 1 partly to a smaller scale and omitting the motor drive shown to the right of Figure 1. The view has been taken substantially on the sectional line 2—2 of Figure 1.

The heating drum C and the spindle D are preferably completely enclosed by the housing B. In the embodiment shown, the housing includes a lower housing 86 connected to the base 10 and an upper housing, as will be described. The upper housing is preferably formed of two shell-like members 88, 89 each of which are pivotally supported on the bracket 43. When these shells 88, 89 are closed, they assume the position shown in Figure 2, and when open may assume the position shown in Figure 3. The principal reason for pivoting these members is to provide access to the drums C in order that the wire to be annealed may be wound or coiled into position. Other means of access can be provided. The shells each have a layer of insulating material 91 on their inner surfaces to prevent undue radiation of heat therethrough and may also have a heat-reflecting surface which will reflect heat radiated from the surface of the drum C back onto the outer surface of the wire A. Fixed to the lower edge of each shell 88, 89 is a semi-circular quench ring 92 of conventional structure. This quench ring, when the shells are in the closed position, forms a complete annulus about the heating drum C and spindle D. The quench ring preferably has a lower side 93 inclined toward the axis of rotation having a plurality of openings 94 through which quench water 27 may be ejected from the interior of the quench ring 92 onto the outer surface of the cooling drum 26 and the wire A extending therearound. The water 27 is directed at the angle shown to prevent water from splashing upwardly into the portion of the housing opposite from the heat drum 25. A guard ring 96 is fixed on the inner circumference of the quench ring 92 and extends into as close proximity with the surface of the heating drum 25 as is possible without interfering with the wire to prevent the convection of heat to or from the chamber opposite the heating drum 25 to the quench water. A drain 97 may be provided in the base plate 10 to allow the various cooling waters to be carried away from the apparatus.

In some instances, the wire being heated may be of a highly corrosive or easily oxidizable matter. If desired, suitable means may be provided for providing a controlled, nonoxidizing atmosphere interiorly of the apparatus.

It will be appreciated that the wire A may be either heated to the annealing temperature and held at this temperature for as long as is desired while being moved axially down the heating drum, or it may be heated to the quench-hardening temperature and subsequently hardened by means of the quench water 27. In either event, the amount of tension on the wire while in the heated state is at an absolute minimum such that the dimensions of the wire will not be changed during the annealing or heating process. Also, as all surfaces are moved at substantially the same speed, there will be no abrasion occurring between the surfaces of the wire or the surfaces of the drum or spindle. It will be appreciated that as the diameter of the drum C is increased while the diameter of the spindle D remains small, the arc of contact between the wire and the heating drum will be continuously increased. Also, the linear feet of wire per turn increases. It will be appreciated that almost any length of wire can be accommodated within the apparatus by simply lengthening the length of the drum C and spindle D. Provision may be made for adjusting the spacing of the drum and spindle if desired. More than one drum may also be used. The axes of rotation of the drum C and spindle D are shown in the figures as vertical. They may also be disposed horizontally, in which event gravitational forces on the wire will not cause overlapping of the wire and binding in the event that the wire should loosen for some reason.

Some means may also be provided for driving the wire onto the drum and spindle at the linear rim speed of the drum so that at no time is there any tension on the wire.

Thus, it will be seen that an embodiment of the invention has been described which accomplishes the objectives set forth hereinabove and others. It is obvious that alterations and modifications will occur to others upon a reading and understanding of this specification. It is my intention to have such modifications and alterations included as part of my invention insofar as they come within the scope of the appended claims.

Having thus described my invention, I claim:
1. In apparatus for continuously handling elongated lengths of a flexible element comprising in combination, a pair of cylindrically-shaped members supported for rotation on spaced, generally-parallel axes, said element being coiled around said members in a plurality of turns and continuously coiled onto one end of said members and fed off the other end of said members as said members are rotated, at least one of said members being formed in two parts in heat-insulated relationship, one from the other, one of said parts adjacent the end where said element feeds onto said member adapted to heat said element and the other part adapted to cool said element.

2. In apparatus for continuously handling elongated lengths of a flexible element comprising in combination, a pair of cylindrically-shaped members supported for rotation on spaced, generally-parallel axes, said element being adapted to be coiled around said members in a plurality of turns and to be coiled onto one end of said members and fed off the other end of said members as said members are rotated, at least one of said members being formed in two parts in heat-insulated relationship, the part where said element feeds onto one of said members being heated and the other part being cooled, at least one of said members gradually increasing in diameter over the portion of the axis corresponding to the heated portion and decreasing in diameter over the portion of the axis corresponding to the cooled portion.

HARRY L. KELLER.

References Cited in the file of this patent

UNITED STATES PATENTS

| Number | Name | Date |
|---|---|---|
| 496,208 | Procunier | Apr. 25, 1893 |
| 895,973 | Daniels | Aug. 11, 1908 |
| 1,243,443 | Pierce | Oct. 16, 1917 |
| 1,365,414 | Kochendorfer | Jan. 11, 1921 |
| 1,607,675 | Jefferies | Nov. 23, 1926 |
| 1,828,036 | Fahrenwald | Oct. 20, 1931 |
| 1,916,372 | Hepburn et al. | July 4, 1933 |
| 2,040,343 | Simons et al. | May 12, 1936 |
| 2,294,413 | Marshall | Sept. 1, 1942 |
| 2,500,566 | Phillips | Mar. 14, 1950 |
| 2,587,742 | Lorig | Mar. 4, 1952 |